United States Patent [19]

Stodola

[11] 4,342,112

[45] Jul. 27, 1982

[54] ERROR CHECKING CIRCUIT

[75] Inventor: Kevin C. Stodola, Cedar Rapids, Iowa

[73] Assignee: Rockwell International Corporation, El Segundo, Calif.

[21] Appl. No.: 185,119

[22] Filed: Sep. 8, 1980

[51] Int. Cl.³ .............................................. G06F 11/16

[52] U.S. Cl. ..................................... 371/68; 328/120; 371/3; 371/63; 371/65

[58] Field of Search ....................... 371/68, 1, 3, 8, 65, 371/63; 328/120

[56] References Cited

U.S. PATENT DOCUMENTS

| | | | |
|---|---|---|---|
| 3,551,886 | 12/1970 | Cook | 371/65 |
| 3,559,167 | 1/1971 | Carter et al. | 371/3 |
| 3,601,804 | 8/1971 | Wainwright et al. | 371/68 |
| 3,633,162 | 1/1972 | Findeisen | 371/65 |
| 3,634,665 | 1/1972 | Carter et al. | 371/63 |
| 3,795,867 | 3/1974 | Jones, Jr. | 328/120 |
| 3,810,119 | 5/1974 | Zieve et al. | 371/68 |
| 3,961,203 | 6/1976 | Hutch | 328/120 |

*Primary Examiner*—Charles E. Atkinson
*Attorney, Agent, or Firm*—Bruce C. Lutz; Howard R. Greenberg; H. Fredrick Hamann

[57] ABSTRACT

An error checking circuit is provided for a digital transmission system having a dual, redundant, bus structure. The error checking circuit generates a two rail logic output having complementary states in the absence of an error, and non-complementary states in response to an error on the buses. The circuit is also self-checking in that internal failures are transmitted to the output as an error indication. The circuit is actively exercised in the absence of an error to prevent silent failures. The circuit can identify which of the buses has failed, for the most common types of failures.

13 Claims, 6 Drawing Figures

ERROR CHECKING CIRCUIT

TECHNICAL FIELD

The invention relates to circuitry used for detecting errors in a digital transmission system having a dual, redundant, bus structure.

BACKGROUND

In digital transmission systems, a dual or redundant system structure is commonly employed for increased system reliability. A system is duplicated to provide two sets of outputs. The outputs may be compared to detect errors. When a bad output is detected, the subsequent components of the system may be switched to use the good output.

There is a need for a simple and efficient circuit for checking the outputs of a dual system to detect errors occurring on either of the two system outputs or buses. Furthermore, there is a need for a circuit of this character which also produces an error indication in response to an internal failure within the error checking circuit itself, to afford a self-checking circuit. There is a further need for a circuit of this character which actively exercises the detection circuitry in the absence of an error to provide an early warning of a fault within the detection circuit and hence prevent silent failures. There is a still further need for a circuit which can additionally identify which of the buses has failed, for the most common types of failures.

SUMMARY

The present invention provides an improved error checking circuit for a digital transmission system having a dual, redundant, bus structure. The error checking circuit satisfies the above noted and other needs, and does so in a particularly simple and efficient manner.

The error checking circuit detects failures on either bus. Additionally, any single point failure within the error checking circuit itself will produce an error indication, thus providing a self-checking circuit.

The error checking circuit of the present invention implements in the preferred embodiment a form of two rail logic. In two rail logic, signals are generated in both true and complement form, on two rails. The signals present on the two rails of a signal pair should always be complementary. An error is indicated if the two rails of any signal pair are not complementary. It should be noted that a dual, redundant, system structure is not a two rail system, but is rather a duplicated system.

The error checking circuit of the present invention responds to both buses and generates in the preferred form a two rail logic output therefrom having complementary states in the absence of an error and having non-complementary states in response to an error on the buses. Furthermore, the two rail logic is designed such that any error at any signal pair within the two rail logic error circuit will be transmitted through the following logic in the circuit such that the error may be detected at the final output of the circuit. Thus, any error presented to the checking circuit, or occurring within the circuit, will be indicated at the final output of the circuit.

In a particularly desirable aspect of the invention, the circuit changes the output logic states on the two rails at frequent intervals so that the logic gates in the circuit are frequently used, and hence a fault occurring within the circuit itself will become readily apparent at an early stage. The error checking circuit is thus actively exercised, whereby to prevent silent failures.

Another feature of the invention is its ability to additionally identify which of the dual buses has failed, for the most common types of failures.

DETAILED DESCRIPTION

Figure 1:
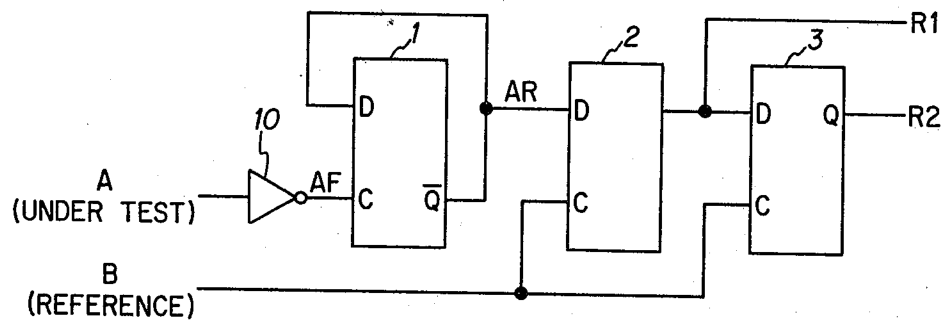
FIG. 1 is a circuit diagram of an error checking circuit constructed in accordance with the invention.

FIG. 1 shows a circuit for detecting errors on dual, redundant buses A and B. In redundant systems, the outputs are usually synchronous to each other, although some variation in phase drift and pulse length between the signals on bus A and bus B is tolerated by the error checking circuit of the present invention. In FIG. 1, bus A is tested against bus B as a reference.

Figure 2:
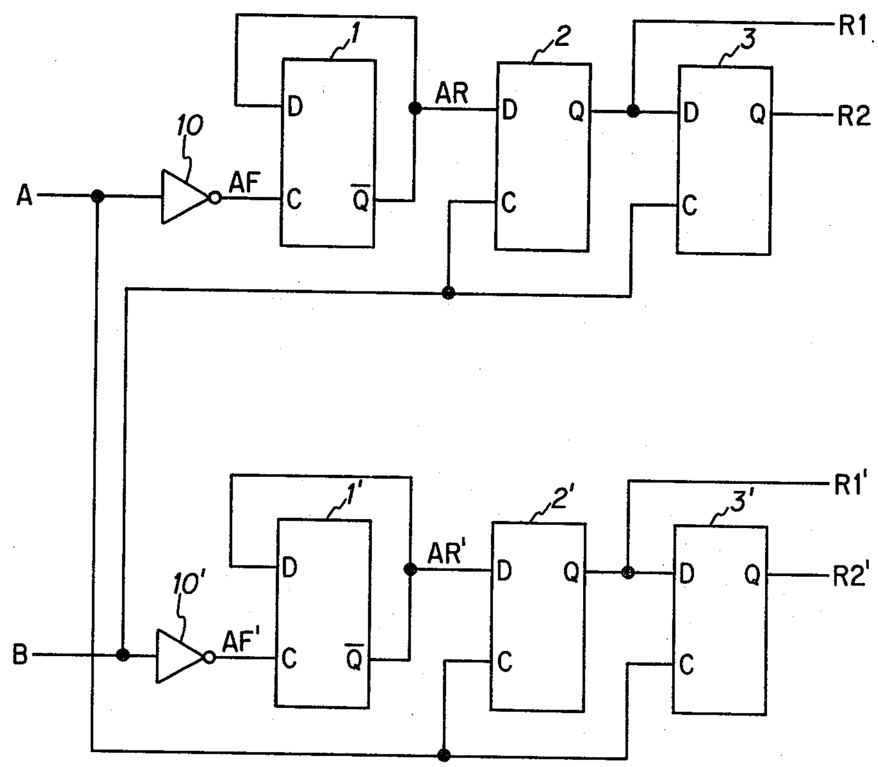
FIG. 2 is a circuit diagram of a dual error checking circuit constructed in accordance with the invention.

A complete system check is performed by the circuit in FIG. 2 which comprises two of the error checking circuits of FIG. 1 to form a dual error checking circuit. In FIG. 2, the first circuit uses the B system output, or bus B, as a reference for testing bus A. The second circuit uses bus A as a reference for testing bus B.

In FIG. 1, signal transitions from 1 to 0 on bus A cause transitions from 0 to 1 of signal AF due to inverter 10. Signal AF clocks the first of three ganged type D flip-flops 1, 2 and 3. The second and third flip-flops 2 and 3 are clocked by pulses from bus B.

The 0 to 1 transitions of signal AF from inverter 10 cause the first flip-flop 1 to toggle because the false output $\overline{Q}$ (signal AR) is tied to the true data input of flip-flop 1. Therefore, every transition from 1 to 0 on bus A will cause flip-flop 1 to toggle.

Every 0 to 1 transition on bus B causes the true output Q of flip-flop 2, which is the signal appearing on rail R1, to be shifted through the third flip-flop 3 onto the latter's true output Q which is the second rail R2 of the two rail logic output. At the same time, signal AR from the $\overline{Q}$ output of flip-flop 1 is shifted through flip-flop 2 to its Q output to appear on the first rail R1.

As long as a 1 to 0 transition occurs on bus A at or during the interim between every 0 to 1 transition on bus B, each transition of 0 to 1 on bus B will cause R1 and R2 to toggle, each being the complement of the other. Thus R1 and R2 form a two rail logic output.

Figure 3:
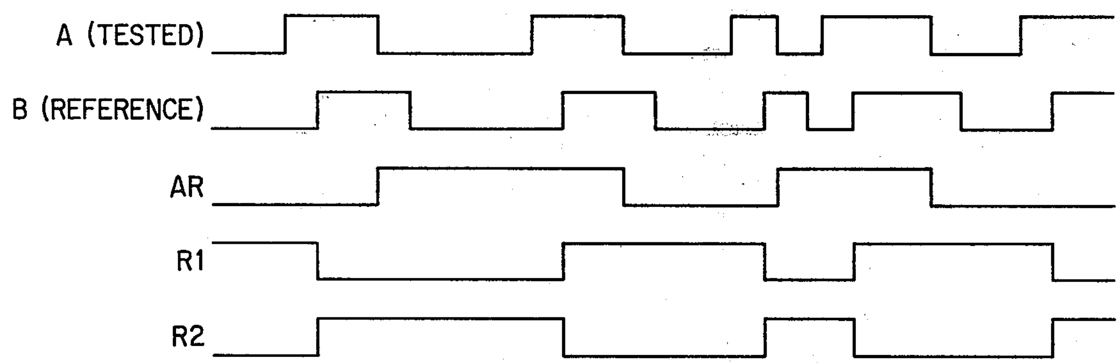
FIG. 3 is a timing diagram showing typical operation of the error checking circuit of FIG. 1.
Figure 4:
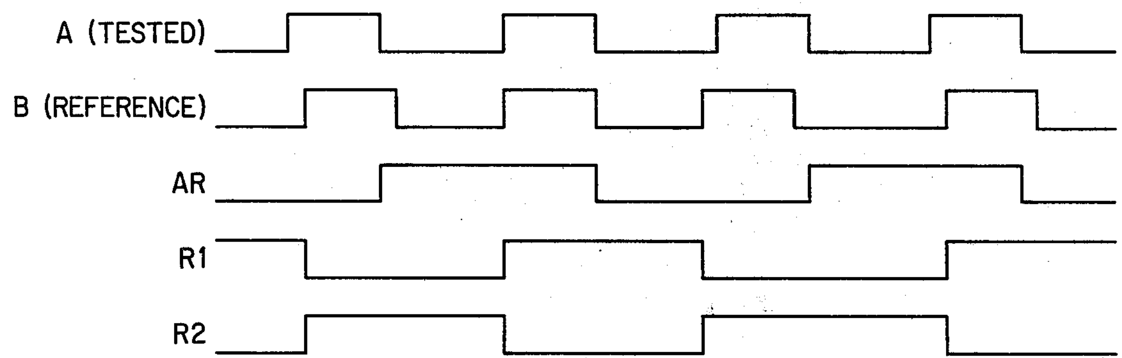
FIG. 4 is a timing diagram showing operation of the error checking circuit of FIG. 1 with some phase drift between the signal pulses on the buses.

This operation is illustrated in FIGS. 3 and 4. In FIG. 3, the signals on buses A and B are out of phase. In FIG. 4, there is a phase drift between the signals on buses A and B.

Figure 5:
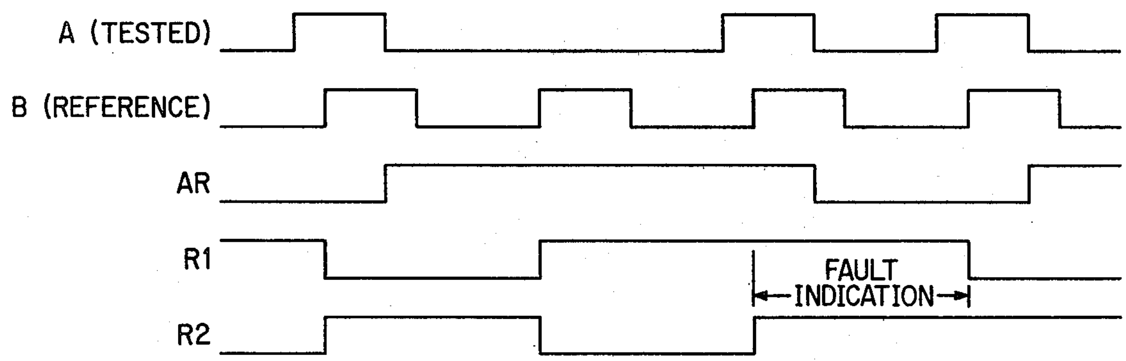
FIG. 5 is a timing diagram showing operation of the error checking circuit of FIG. 1 and shows an example of an error detection giving a fault indication.

If the signal on bus A ever misses a cycle, as shown by the absent pulse in FIG. 5, then signal AR will not have toggled between successive 0 to 1 transitions on bus B. Thus, on the second 0 to 1 transition of the signal on bus B, R1 will remain constant while R2 switches to the same state as R1. These non-complementary states of R1 and R2 thus provide a fault indication as shown in FIG. 5.

Failure within the circuit of FIG. 1 will also cause a two rail violation on R1 and R2, providing an error indication. If either inverter 10 or flip-flop 1 fails, then AR no longer toggles on 1 to 0 transitions of the signal on bus A as described above. Therefore, R1 and R2 would again reach the steady state output of non-complementary states as when there is a failure on bus A. If flip-flop 2 fails, then its failed output R1 would be repeatedly shifted into flip-flop 3, and again the outputs R1 and R2 would be non-complementary. If flip-flop 3 fails, then its output R2 would fail to toggle predictably. Since flip-flop 2 would continue to toggle predictably, R1 and R2 would at times be in non-complementary states. The second circuit of the dual circuit of FIG. 2 operates equivalently, and the same primed reference characters are used to facilitate understanding.

Another feature of the invention is its additional ability to identify which of the dual buses has failed, for many of the most common types of failures. The dual circuit in FIG. 2 will, in addition to indicating that an error has occurred, also identify which of the buses has failed for the majority of failures. Even if the failure is of a type which is not amenable to bus identification by the circuit, the circuit will still indicate that an error has occurred.

In many applications, the increased reliability of a dual bus system can be attributed largely to the duplication of the bus itself. The bus itself is frequently the weak link in a system because of the amount and length of cabling associated with the bus, the number of electrical loads placed upon the bus, the higher current and/or voltage driven by the bus, etc. In many cases, a bus failure will appear as the complete loss of a signal. This can be due to an electrical short of a bus signal to ground or stable voltage (either along the bus wire or at one of the many bus loads or connections), the failure of the device driving the bus, or the failure of a bus connection due to a wire break or improper connection. Many failures within the equipment driving the bus will also result in the loss of a bus signal.

Figure 6:
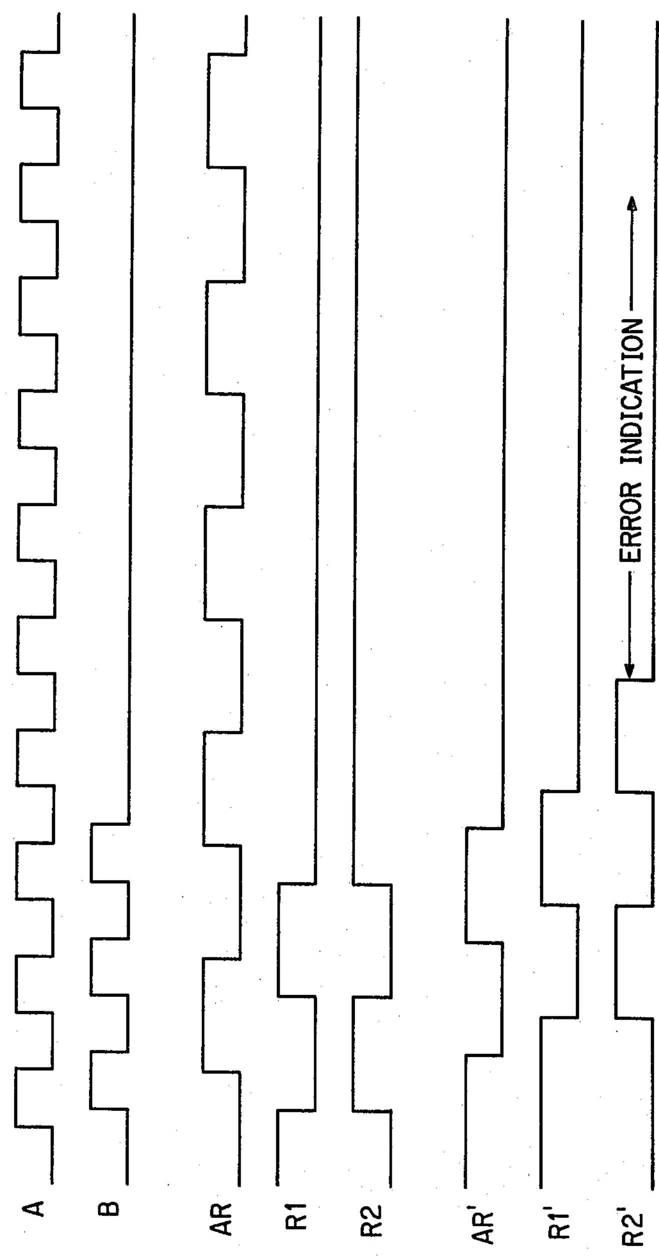
FIG. 6 is a timing diagram showing operation of the error checking circuit of FIG. 2 illustrating its ability to indicate which of the dual buses has failed.

The error detector circuit in FIG. 2 will identify which of the data buses has the detected error for those types of failures resulting in a loss of signal. A loss of signal on one of the dual buses A and B will cause one of the two error detector circuits to reach a steady state with an error condition indicated on its outputs. If the failure is on bus A, signal AR will reach a steady state followed by R1 and R2 indicating an error condition. If the failure occurs on bus B, signal AR′ will reach a steady state followed by R1′ and R2′ indicating an error condition as illustrated in FIG. 6.

This ability to indicate which of the buses has the failure, for the majority of types of failures, is particularly useful to facilitate diagnosis of bus failures in order to speed the switchover to the good bus. In high integrity applications, the detector in FIG. 2 should not be used as the sole means of bad bus identification. Even in such systems however, the circuit is still a valuable statistical diagnostic tool.

The invention thus provides an error checking circuit comprising means responsive to one bus A as a tested signal source and to the other bus B as a reference signal source. The circuit of FIG. 1 generates a two rail logic output R1 and R2 having complementary states in the absence of an error and having non-complementary states in response to an error. The error checking circuit comprises first switch means implemented by flip-flop 1 gated by bus A, and second switch means implemented by flip-flops 2 and 3 responsive to the first switch means and gated by the other bus B. The second switch means generates the two rail output. A failure in either of the first and second switch means is transmitted to the two rail output as a non-complementary state, indicating an error, whereby to afford a self-checking circuit which detects internal failures. The second switch means which generates the two rail output also changes the states thereof at given intervals (as clocked by the pulses on bus B) to actively exercise the error checking circuit in the absence of an error or buses A and B. This affords an early alert of a fault in the error checking circuit, and hence prevents silent failures.

The second switch means implemented by flip-flops 2 and 3 generates an output whose polarity is dependent upon interim pulse occurrence on bus A between successive pulses on bus B, to afford an indication of pulse absence. In the preferred embodiment the first switch means implemented by flip-flop 1 is connected to bus A and it generates an output whose polarity changes in response to each pulse from bus A. The second switch means implemented by flip-flops 2 and 3 is connected to bus B and to the first switch means, and generates the pair of output rails R1 and R2 in response to each pulse from bus B. Rail R1 has the polarity of the current output from the first switching means. Rail R2 has the polarity of the output from the first switching means at the immediately preceding pulse on bus B. In this embodiment then, the rails are complementary if a pulse occurs on bus A at or during the interim between pulses on bus B, and the rails are non-complementary in the absence of a pulse on bus A during the interim between pulses on bus B. In this preferred form, the second switch means comprises a first stage implemented by flip-flop 2 gating the output of the first switch means through to rail R1 in response to a pulse from bus B, and a second storage stage implemented by flip-flop 3 storing this last mentioned output until the next successive pulse from bus B and then gating this last mentioned output through to rail R2.

It is recognized that numerous modifications are possible within the scope of the appended claims.

I claim:

1. In a digital transmission system having a dual, redundant, bus structure with buses A and B, an error checking circuit comprising means responsive to one bus as a tested signal source and to the other bus as a reference signal source and generating a two rail logic output having complementary states in the absence of an error and having non-complementary states in response to an error, said error checking circuit additionally comprising first switch means gated by bus A, and second switch means responsive to said first switch means and gated by bus B, said second switch means generating said two rail output, wherein a failure in either of said first and second switch means is transmitted to said two rail output as a non-complementary state, indicating an error, whereby to afford a self-checking circuit which detects internal failures.

2. In a digital transmission system having a dual, redundant, bus structure with buses A and B, an error checking circuit comprising means responsive to one bus as a tested signal source and to the other bus as a reference signal source and generating a two rail logic output having complementary states in the absence of an error and having non-complementary states in response to an error, said error checking circuit additionally comprising first switch means gated by bus A, and second switch means responsive to said first switch means and gated by bus B, said second switch means generating said two rail output.

3. The invention according to claim 2 wherein a failure in either of said first and second switch means is transmitted to said two rail output as a non-changed state on one of the rails thereby yielding a non-complementary state of the two rails, indicating an error, whereby to afford a self-checking circuit.

4. In a digital transmission system having a dual, redundant, bus structure with buses A and B, an error checking circuit comprising means responsive to one bus as a tested signal source and to the other bus as a reference signal source and generating a two rail logic output having complementary states in the absence of an error and having non-complementary states in response to an error, said error checking circuit additionally comprising ganged flip-flops, one of which is clocked by said one bus, and at least another of which is clocked by said other bus.

5. The invention according to claim 4 wherein said error checking circuit comprises:

- a first flip-flop clocked by said one bus and having an output fed back to a data input thereof;
- a second flip-flop clocked by said other bus and having a data input from said output of said first flip-flop; and
- a third flip-flop clocked by said other bus and having a data input from an output of said second flip-flop, said output of said second flip-flop and an output of said third flip-flop providing said two rail logic output.

6. The invention according to claim 5 wherein:

- each said flip-flop is a type D flip-flop;
- said error checking circuit further comprises an inverter connected to the C input of said first flip-flop;
- said one bus is connected to said inverter;
- said other bus is connected to the C inputs of said second and third flip-flops;
- the $\bar{Q}$ output of said first flip-flop is connected to the D input of said first flip-flop and to the D input of said second flip-flop;
- the Q output of said second flip-flop is connected to the D input of said third flip-flop and to one of said rails; and
- the Q output of said third flip-flop is connected to the other of said rails.

7. In a digital transmission system having a dual, redundant, bus structure, an error checking circuit comprising first switch means gated by pulses on one of said buses, and second switch means responsive to said first switch means and gated by pulses on the other of said buses to generate an output polarity dependent upon interim pulse occurrence on said one bus between successive pulses on said other bus, to afford an indication of pulse absence.

8. The invention according to claim 7 wherein the output of said second switch means changes polarity upon each pulse on said other bus if an interim pulse occurs on said one bus, such that said circuit is actively exercised in the absence of an error, to prevent silent failures.

9. The invention according to claim 8 wherein said first switch means comprises a flip-flop clocked by said one bus and having an output connected to an input of the flip-flop such that said flip-flop toggles upon each pulse on said one bus, and said second switch means comprises a second flip-flop clocked by said other bus and having an input connected to an output of said first flip-flop.

10. In a digital transmission system having a dual, redundant, bus structure with buses A and B, an error checking circuit comprising:

- first switch means connected to bus A and generating an output whose polarity changes in response to each pulse from bus A; and
- second switch means connected to bus B and to said first switch means, and generating a pair of output rails R1 and R2 in response to each pulse from bus B, rail R1 having the polarity of the current output from said first switching means, rail R2 having the polarity of the output from said first switching means at the immediately preceding pulse on bus B, such that said rails are complementary if a pulse occurs on bus A during the interim between pulses on bus B, and said rails are non-complementary in the absence of a pulse on bus A during the interim between pulses on bus B.

11. The invention according to claim 10 wherein said second switch means comprises a first stage gating said output of said first switch means through to rail R1 in response to a pulse from bus B, and a second storage stage storing said last mentioned output until the next successive pulse from bus B and then gating said last mentioned output through to rail R2.

12. In a digital transmission system having a dual, redundant, bus structure, a dual error checking circuit comprising:

- first means responsive to one bus as a tested signal source and to the other bus as a reference signal source and generating a two rail logic output having complementary states in the absense of an error and having non-complementary states in response to an error; and
- second means response responsive to said other bus as a tested signal source and to said one bus as a reference signal source and generating a two rail logic output having complementary states in the absence of an error and having non-complementary states in response to an error.

13. The invention according to claim 12 wherein:

- said first means comprises a first circuit comprising first switch means gated by said one bus, and second switch means responsive to an output from said first switch means and gated by said other bus, said second switch means generating said first mentioned two rail logic output, wherein a loss of signal on said one bus causes said output of said first switch means to reach a steady state followed by non-complementary states of said first mentioned two rail logic output; and
- said second means comprises a second circuit comprising third switch means gated by said other bus, and fourth switch means responsive to an output from said third switch means and gated by said one bus, said fourth switch means generating said second mentioned two rail logic output, wherein a loss of signal on said other bus causes said output from said third switch means to reach a steady state followed by non-complementary states of said second mentioned two rail logic output.

* * * * *